US012634556B2

(12) United States Patent
Deshmukh et al.

(10) Patent No.: US 12,634,556 B2
(45) Date of Patent: May 19, 2026

(54) FILTERING TELEVISION CONTENT BASED ON VIEWER CLASSIFICATIONS

(71) Applicants: DISH Network L.L.C., Englewood, CO (US); DISH Network Technologies India Private Limited, Bangalore (IN)

(72) Inventors: Shailesh Deshmukh, Livermore, CA (US); Bala Krishna Nelluri, Bangalore (IN)

(73) Assignees: DISH Network L.L.C., Englewood, CO (US); DISH Network Technologies India Private Limited (IN)

( * ) Notice: Subject to any disclaimer, the term of this patent is extended or adjusted under 35 U.S.C. 154(b) by 82 days.

(21) Appl. No.: 18/529,595

(22) Filed: Dec. 5, 2023

(65) Prior Publication Data

US 2025/0184568 A1    Jun. 5, 2025

(51) Int. Cl.
*H04N 21/454*          (2011.01)
*H04N 21/258*          (2011.01)
*H04N 21/466*          (2011.01)

(52) U.S. Cl.
CPC ..... *H04N 21/454* (2013.01); *H04N 21/25891* (2013.01); *H04N 21/4665* (2013.01); *H04N 21/4668* (2013.01)

(58) Field of Classification Search
CPC ........... H04N 21/454; H04N 21/25891; H04N 21/4665; H04N 21/4668
See application file for complete search history.

(56) References Cited

U.S. PATENT DOCUMENTS

| | | | |
|---|---|---|---|
| 9,230,212 B2 * | 1/2016 | Su | G06N 5/02 |
| 2012/0246161 A1 | 9/2012 | Murakami | |
| 2016/0080815 A1 | 3/2016 | Ruffini et al. | |
| 2016/0283470 A1 * | 9/2016 | Solomon | G06Q 50/26 |
| 2020/0112755 A1 | 4/2020 | Seshadri et al. | |
| 2022/0167053 A1 * | 5/2022 | Greene | H04N 21/4532 |
| 2023/0297625 A1 | 9/2023 | Ojo et al. | |

OTHER PUBLICATIONS

Shailesh Deshmukh et al., "Profile-Based Channel Recommenations for New Users of a Streaming Service," U.S. Appl. No. 18/512,689, filed Nov. 17, 2023. (29 Pages).

* cited by examiner

*Primary Examiner* — Nathan J Flynn
*Assistant Examiner* — Christine A Kurien
(74) *Attorney, Agent, or Firm* — Jeremiah J. Baunach; Frontier IP Law PLLC

(57) ABSTRACT

Described herein are methods, systems, and media for filtering content items in a streaming service. In an embodiment, an exemplary method include classifying a user of a streaming service into one of a plurality of groups based on watch behavior of the user in a first past period, each of the plurality of groups being associated with a tag; and recommending channels to the user based on watch behavior of the user in a second past period, each of the plurality of channels being associated with a tag. The method further includes removing one or more channels from the recommended channels, each removed channel being associated with a tag contrary to the tag associated with the group that the user has been classified into; and displaying one or more content items from each of remaining channels on a streaming device of the user. The disclosure also discloses embodiments of flagging channels that conflict with user classifications.

20 Claims, 9 Drawing Sheets

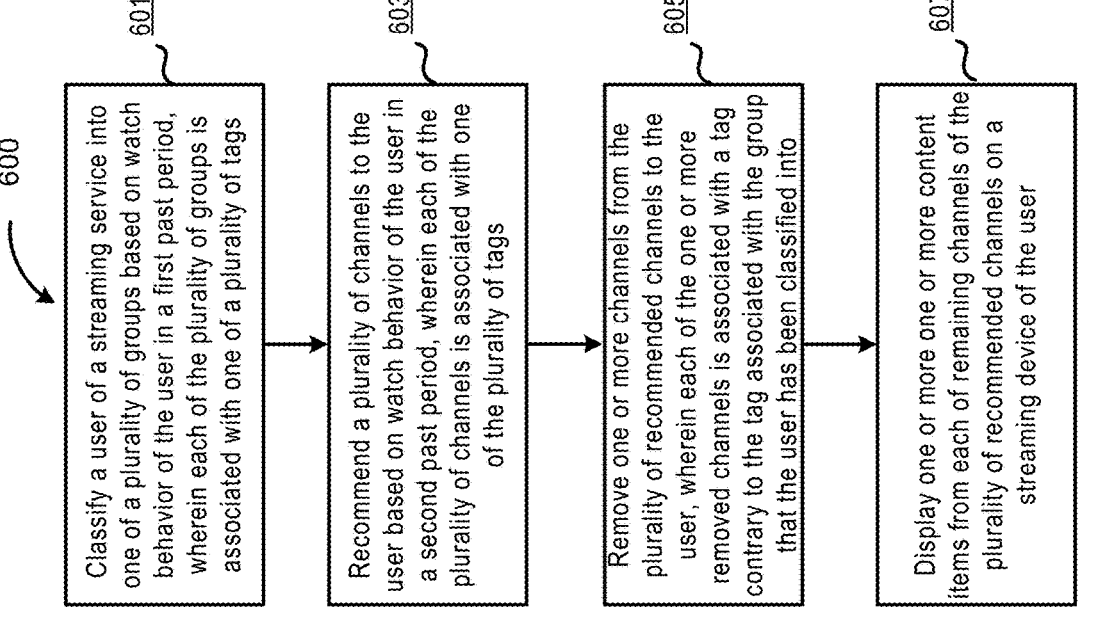

600

601

Classify a user of a streaming service into one of a plurality of groups based on watch behavior of the user in a first past period, wherein each of the plurality of groups is associated with one of a plurality of tags

603

Recommend a plurality of channels to the user based on watch behavior of the user in a second past period, wherein each of the plurality of channels is associated with one of the plurality of tags

605

Remove one or more channels from the plurality of recommended channels to the user, wherein each of the one or more removed channels is associated with a tag contrary to the tag associated with the group that the user has been classified into

607

Display one or more one or more content items from each of remaining channels of the plurality of recommended channels on a streaming device of the user

FIGURE 6

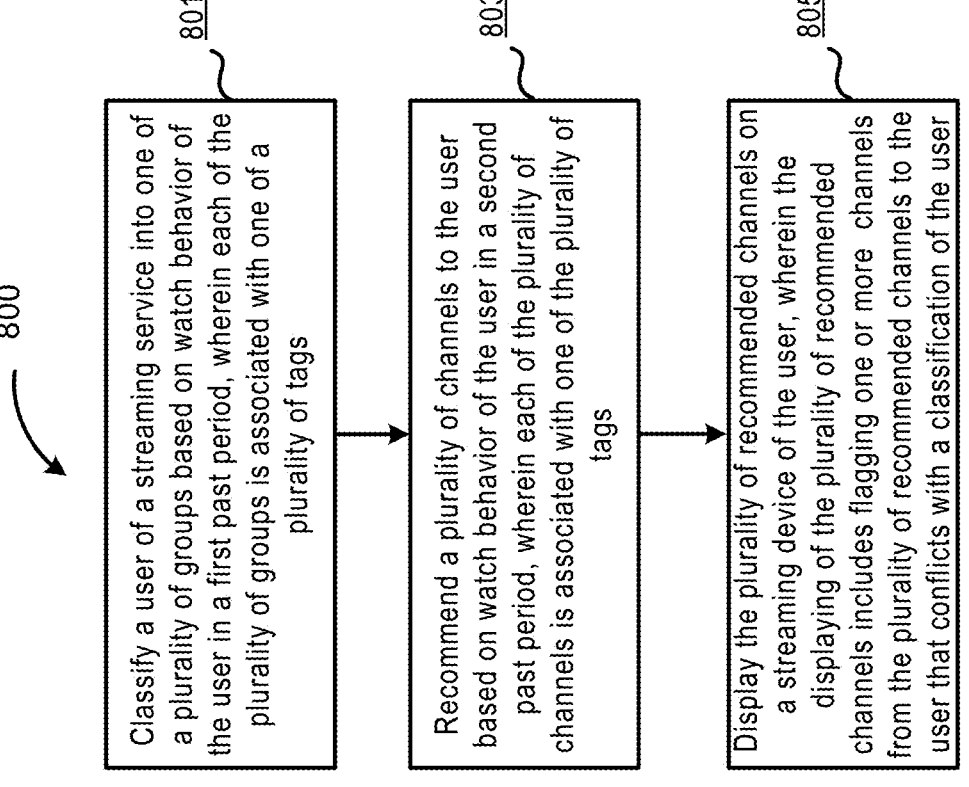

800

801

Classify a user of a streaming service into one of a plurality of groups based on watch behavior of the user in a first past period, wherein each of the plurality of groups is associated with one of a plurality of tags

803

Recommend a plurality of channels to the user based on watch behavior of the user in a second past period, wherein each of the plurality of channels is associated with one of the plurality of tags

805

Display the plurality of recommended channels on a streaming device of the user, wherein the displaying of the plurality of recommended channels includes flagging one or more channels from the plurality of recommended channels to the user that conflicts with a classification of the user

FIGURE 8

FILTERING TELEVISION CONTENT BASED ON VIEWER CLASSIFICATIONS

TECHNICAL FIELD

The present disclosure relates to streaming services, more particularly, to a filter that can filter out content items recommended by a collaborative filter that are contrary to viewers' biases.

BRIEF SUMMARY

In the realm of streaming services, such as Sling TV, a collaborative filtering system recommends content items to users of a streaming service based on their preference and historical watch behavior. For users inclined towards news content, such a system can suggest news channels. However, the recommended news channels may have differing bias. With the public becoming increasingly fragmented and polarized, users may find the recommended news items contrary to their biases unsettling or even objectionable. Over time, these disgruntled users may discontinue their subscriptions to the streaming service. Also, some users may prefer to opt in to receive recommended alternative channels and programming contrary to their detected political bias so that the user could receive content from different political viewpoints (e.g., a user classified as liberal opting in to receive recommendations contrary to their political classification and thus receiving a recommendation for a conservative channel or content). This would help to avoid the political "echo chamber" effect and reduce political bias.

Described herein are methods, systems, and media for filtering content items in a streaming service. In an embodiment, an exemplary method include classifying a user of a streaming service into one of a plurality of groups based on watch behavior of the user in a first past period, wherein each of the plurality of groups is associated with one of a plurality of tags; and recommending a plurality of channels to the user based on watch behavior of the user in a second past period, wherein each of the plurality of channels is associated with one of the plurality of tags. The method further includes removing one or more channels from the plurality of recommended channels to the user, wherein each of the one or more removed channels is associated with a tag contrary to the tag associated with the group that the user has been classified into; and displaying one or more content items from each of remaining channels of the plurality of recommended channels on a streaming device of the user.

In some embodiments of the method, each of the plurality of channels recommended to the user is a news channel.

In some embodiments of the method, the plurality of recommended channels include one or more liberal channels and one or more conservative channels.

In some embodiments of the method, the plurality of groups includes a conservative group, a neutral group, and a liberal group.

In some embodiments of the method, the classifying of the user into one of the plurality of groups further includes: determining a number of days that the user has watched each of the plurality of recommended channels within the first past period; if the user has watched a liberal channel for a number of days no more than a threshold and has watched a conservative channel for a number of days exceeding the threshold, classifying the user into the conservative group; if the user has watched a conservative channel for a number of days no more than a threshold and has watched a liberal channel for a number of days exceeding the threshold, classifying the user into the liberal group; and if the user has watched each of a conservative channel and a liberal channel for a number of days no more than the threshold or has watched each of a conservative channel and a liberal channel for a number of days exceeding the threshold, classifying the user into the neutral group.

In some embodiments of the method, the threshold is one of a 30-day period, a 60-day period, or a 90-day period.

In some embodiments of the method, each of the first past period and the second past period is a multiple of the threshold.

In some embodiments of the method, the tag associated with each of the plurality of channels is predetermined by the streaming service.

In some embodiments of the method, the streaming service is an application-based television service that streams live television and on-demand content over the internet.

According to other embodiments, the methods can be implemented by a system and/or a computer-readable storage medium as described herein.

In an embodiment, the system implements another method of filtering content items in a streaming service. The method includes classifying a user of a streaming service into one of a plurality of groups based on watch behavior of the user in a first past period, wherein each of the plurality of groups is associated with one of a plurality of tags; recommending a plurality of channels to the user based on watch behavior of the user in a second past period, wherein each of the plurality of channels is associated with one of the plurality of tags; and displaying the plurality of recommended channels on a streaming device of the user, wherein the displaying of the plurality of recommended channels includes flagging one or more channels from the plurality of recommended channels to the user that conflicts with a classification of the user.

In some embodiments of the method, wherein the flagging of the one or more channels comprises one or more of the following: highlighting each of the one or more channels on the user's home page or landing screen; or displaying in-app messages or banners about the each of the one or more channels while the user is streaming.

In an embodiment, the system can be a multi-node cloud system, where the operations for filtering content items in a streaming service can be distributed across multiple processing nodes to increase the system's scalability, fault tolerance, and performance in terms of processing speed of the system. Further, data related to the operations can be loaded into a distributed shared memory (DSM) to be accessed by multiple processing nodes. The DSM enhances the system's scalability since it allows more processing nodes to be added as more processing power is needed. As the system expands, it offers increased memory resources to the applications, boosting overall performance. Further, the DSM facilitates the efficient use of memory resources spread across different machines. If a node is grappling with high memory consumption, it has the capability to tap into the unused memory of other nodes, enhancing the adaptability of the cloud-based computing system.

As shown above and in more detail throughout the disclosure, various embodiments of the disclosure provide technical improvements over existing systems for filtering content items in a streaming service. These and other features and advantages of the disclosure will become more readily apparent in view of the embodiments described herein and illustrated in this specification.

BRIEF DESCRIPTION OF THE DRAWINGS

Non-limiting and non-exhaustive embodiments are described with reference to the following drawings. In the drawings, like reference numerals refer to like parts through-out the various figures unless otherwise specified.

For a better understanding of the present invention, reference will be made to the following Detailed Description, which is to be read in association with the accompanying drawings:

FIG. 6 is a block diagram illustrating a process of filtering news items in a streaming service according to an embodiment of the disclosure.

FIG. 8 is a flowchart illustrating a process of flagging one or more channels that conflicts with a user's classification according to one embodiment of the disclosure.

DETAILED DESCRIPTION

The following description, along with the accompanying drawings, sets forth certain specific details in order to provide a thorough understanding of various disclosed embodiments. However, one skilled in the relevant art will recognize that the disclosed embodiments can be practiced in various combinations, without one or more of these specific details, or with other methods, components, devices, materials, etc. In other instances, well-known structures or components that are associated with the environment of the present disclosure, including but not limited to the commu-nication systems and networks, have not been shown or described in order to avoid unnecessarily obscuring descrip-tions of the embodiments. Additionally, the various embodi-ments can be methods, systems, media, or devices. Accord-ingly, the various embodiments can be entirely hardware embodiments, entirely software embodiments, or embodi-ments combining software and hardware aspects.

Throughout the specification, claims, and drawings, the following terms take the meaning explicitly associated herein, unless the context clearly dictates otherwise. The term "herein" refers to the specification, claims, and draw-ings associated with the current application. The phrases "in one embodiment," "in another embodiment," "in various embodiments," "In some embodiments," "in other embodi-ments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

Figure 1:
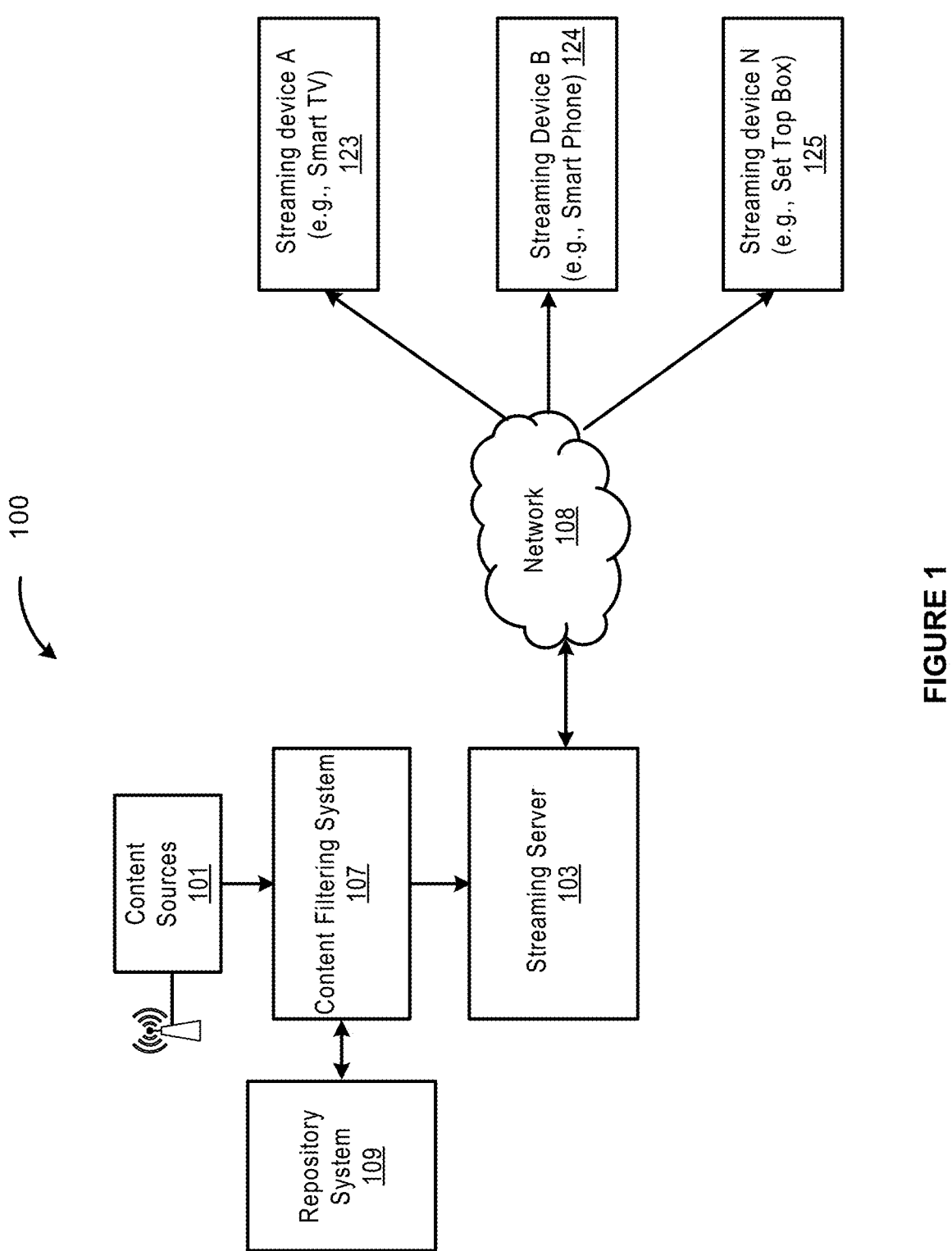
FIG. 1 is a block diagram illustrating an example of a media streaming system 100 in which embodiments of the disclosure are implemented.

FIG. 1 is a block diagram illustrating an example of a media streaming system 100 in which embodiments of the disclosure are implemented. The media streaming system 100 includes a streaming server 103 and a plurality of video streaming devices 123-125. The streaming server 103 receives media content from one or more content sources 101 and transmits that media content through the network 108 to the streaming devices 123-125 in the form of a data stream that can be received, processed, and presented to the user at the streaming devices 123-125.

The content sources 101 can be any type of media content source, including media providers, content aggregators or distributors such as a cable television system operator, a direct broadcast satellite (DBS) system operator, satellite radio operator, or simply a network service provider or the like. These content sources 101 can provide the media content to the streaming server 103 in any suitable form and by any suitable technique. For example, the media content can be provided via satellite, fiber optic or any other conventional wireless or physical media for transmitting signals. The transmitted signals can be received, demodu-lated and decoded as needed by any appropriate receiver(s) to extract program signals. The extracted programming signals can then be analyzed as appropriate to identify the program contents. A distributor/aggregator, for example, may encode the extracted signals for distribution on a digital network, for aggregation and redistribution of signals over a DBS or cable distribution system, for generating content stored on a remote storage digital video recorder (RSDVR) or video on demand (VOD) service, or for any other purpose.

This content can then be passed to the streaming server 103. Having received this content, the streaming server 103 can encode the received content into a suitable format for streaming to the streaming devices 123-125. For example, the streaming server 103 can transmit an encoded data stream via a content delivery network (CDN) for distribution on the network 108 (e.g., the Internet) as part of an RSDVR, VOD or other media streaming service. The media streams are thus transmitted to the streaming devices 123-125.

As some specific examples, each of the streaming devices 123-125 can be implemented with any suitable computing device, including laptops, tablets, virtual reality (VR) devices, and mobile communication devices (e.g., smart phones). Such devices may include an integrated display screen, may be coupled to a separate display screen, or may not include a display screen for audio only devices.

Each of the streaming devices 123-125 includes a com-bination of hardware and/or software needed to receive, process, and play the video streams received from the streaming server 103. Each streaming device can include device hardware, an operating system, a streaming applica-tion, one or more non-streaming applications, and streaming support features.

The operating system can be any operating system com-patible with the type of streaming service on which the operating system is installed. For example, the operating system can be Android, iOS, or Samsung One UI if the streaming device 124 is a smart phone. The streaming application can be any streaming applications, for example, Netflix, Hulu, YouTube TV, and Sling TV. Although the figure shows one streaming application on the streaming device 124, multiple streaming applications can be installed on each of the streaming devices 124-125. The streaming support features can be software components providing support functions for the streaming application. For example, the streaming support features can include a "Guide" feature and a "Watch on Demand" feature. These streaming support features can be disabled without impacting the basic functions of the streaming application; they are provided to enhance users' streaming experiences.

For example, the "Guide" feature provides users with an interactive program guide (EPG—Electronic Program Guide) that displays a schedule of the available channels and their programming for an extended period of time, usually up to a week or more into the future. Users can browse through the guide to see what is currently airing, what is coming up, and plan their viewing schedule. It helps users find and select live TV channels and programs. As another example, the "Watch on Demand" feature allows users to access a library of on-demand content. This content includes a variety of movies, TV shows, and other video content that users can watch at their convenience. Instead of being tied to a specific broadcast schedule, users can select content from the On Demand library and watch it whenever they want. This feature adds flexibility to the viewing experience, allowing users to catch up on missed episodes or explore a wide range of content.

The non-streaming applications can be any other applications on a streaming device, such as games, instant messaging applications, fitness tracking applications, music applications, and travel applications.

As further shown, the media streaming system 100 can include a content filtering system 107, which can be a software module, software component, or a separate server. The content filtering system 107 is configured to filter content items (e.g., channels) in a streaming service based on user classification tags indicating biases of the users. The user classifications are based on user watch history stored in a repository system 109, which can be any type of storage, such as a relational database and a NoSQL database. Alternatively, the content filtering system 107 can flag content items contrary to a user's political bias to alert the user of the content items such that the user can watch the content items to reduce biases.

Figure 2:
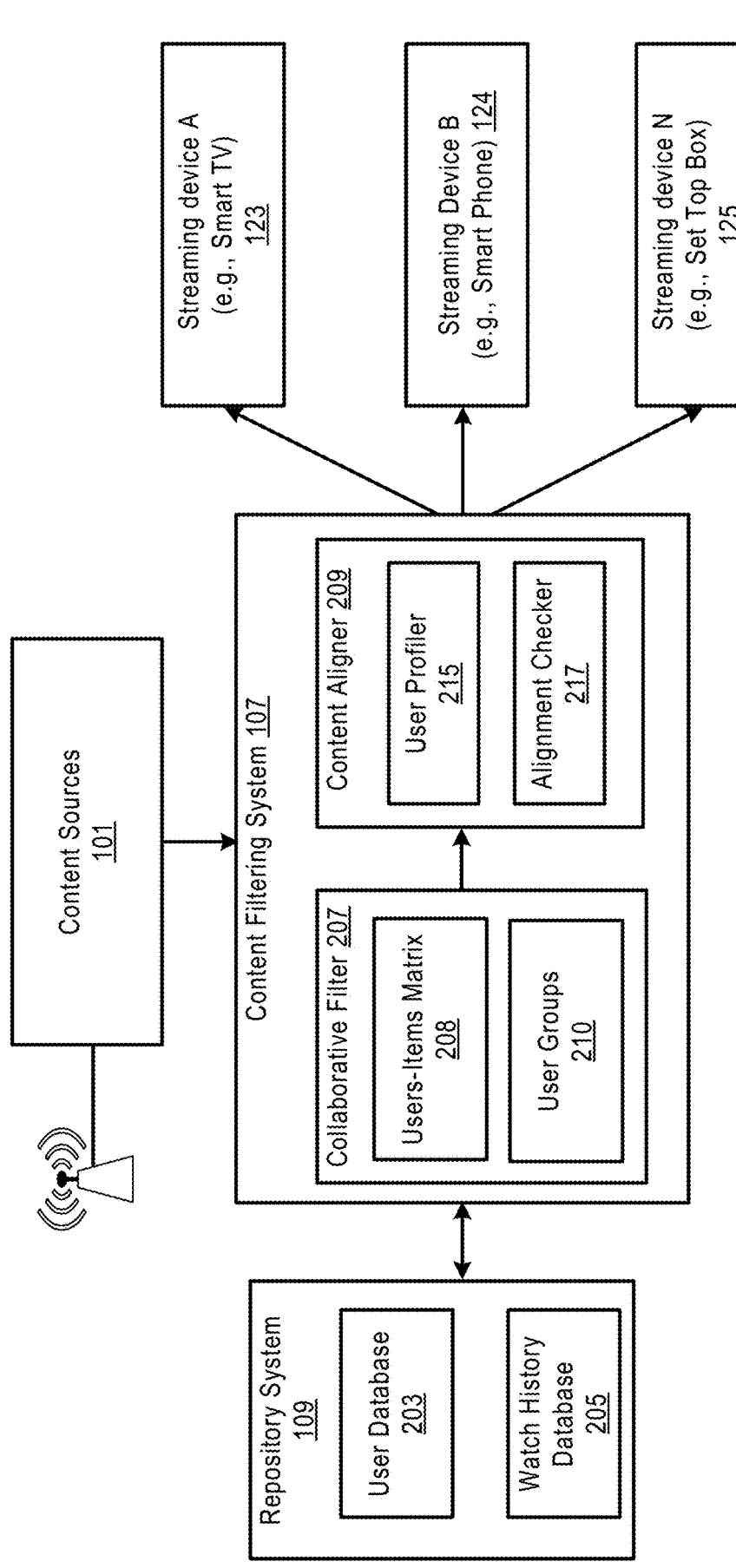
FIG. 2 is a block diagram further illustrating a content filtering system according to an embodiment of the disclosure.

FIG. 2 is a block diagram further illustrating the content filtering system 107 according to an embodiment of the disclosure.

As shown, the content filtering system 107 includes a collaborative filter 207 and a content aligner 209. The collaborative filter 207 is configured to perform collaborative filtering while the content aligner 209 is configured to further refine content items previously filtered by the collaborative filter 207.

In an embodiment, the collaborative filter 207 can be implemented using a machine learning model trained to recommend content items to users based on the preferences of other users with similar tastes. The collaborative filter 207 can include a users-items matrix 208, which can be a table that shows how each user has rated or interacted with each content item. The ratings can be explicit, such as star ratings, or implicit, such as clicks, views, or purchases. Next, the collaborative filter 207 uses the users-items matrix 208 to identify groups of users 210 with similar tastes using a variety of methods, such as the Pearson correlation or cosine similarity. Once the groups of users 210 have been identified, the collaborative filter 207 can recommend items to a user based on the ratings of the users in their group.

For instance, if a user has given high ratings to several movies that other users in their group have also rated highly, the collaborative filter 207 can recommend other movies to the user that are similarly highly rated by those users in the group.

The collaborative filter 207 can use either a memory-based filtering algorithm or a model-based filtering algorithm. The memory-based collaborative filtering algorithm (also referred to as neighborhood-based collaborative filtering) directly taps into the users-items matrix 208 to generate recommendations. In one embodiment, under the memory-based filtering algorithm, the collaborative filter 207 can be a user-user method or an item-item method to recommend items. According to the user-user method, the collaborative filter 207 can recommend content items to a user based on the similarity between that user and other users in a group. According to the item-item method, the collaborative filter 207 can recommend content items based on the likeness of items. On the other hand, the model-based collaborative filtering algorithm involves constructing a predictive model using the users-items matrix 208. Once this model is constructed, it is used to predict user preferences, making direct use of the users-items matrix 208 unnecessary during recommendation.

In an embodiment, in FIG. 2, the collaborative filter 207 can recommend a plurality of news items (e.g., breaking news stories and feature stories) from different channels that are pre-labeled with different tags. Each tag may indicate the bias of a news channel. For example, the tags may indicate that a news channel is liberal or conservative. In this disclosure, if a news channel is labeled as liberal, any news item from that news channel is considered liberal. Similarly, if a news channel is labeled as conservative, any news item from that news channel is considered conservative.

In an embodiment, the labeling of a news channel can be performed by the following method. First, a news content aggregator can be used to collect a representative sample of news content from different channels over a specific period. Then, a natural language processing (NLP) unit can be used to process this content, breaking it down into digestible pieces and identifying key themes, subjects, and sentiments. Next, a sentiment analysis module delves into these key themes to identify any biases, using algorithms that can determine the sentiment behind certain topics. For instance, how a channel reports on climate change or gun control can reveal its political leaning. Subsequently, a political lexicon database can be consulted to match key terms and phrases from the content with known political ideologies. For example, terms like "pro-life" or "tax cuts" might be associated more with conservative ideologies, while "universal healthcare" or "climate action" might be associated more with liberal ideologies. Then, a trained machine learning classifier can be used to classify the news channels. In one implementation, the majority of the analyzed content from News Channel A aligns with keywords and sentiments from the conservative lexicon, and therefore the machine learning classifier labels it as politically conservative. Similarly, most of the analyzed content from News Channel B aligns with the liberal lexicon, it is labeled as politically liberal. The labeling of the news channels can be continually refined based on more content and feedback, ensuring the labels stay current with the evolving nature of the news outlets. In various embodiments, there may be more and/or different political classifications than liberal, conservative and neutral. For example, certain classifications may designate how politically liberal or how politically conservative a channel or content item is.

In an embodiment, the collaborative filter 207 can recommend a plurality of news items from news channels with different labels for a plurality of users based on their historical watch history showing their interest in news channels. The recommended news channels can be received by the content aligner 209, which can further refine the recommended news channels for presenting on the streaming devices 123-125.

As shown, the content aligner 209 can include a user profiler 215 and an alignment checker 217. The user profiler 215 can be a machine learning model, such as a deep learning model, that has been trained to classify users into one of different groups based on user data 203 and watch history 205 of the users. The groups can include a liberal group, a neutral group, and a conservative group, with each group being associated with a label indicating its bias. In various embodiments, there may be more and/or different political classifications than liberal, conservative and neutral. For example, certain classifications may designate how politically liberal or how politically conservative a user or group is.

For example, the liberal group may be associated with a label (e.g., "L" or "Liberal") that indicates that each user classified into this group is a liberal user; the neutral group may be associated with a label (e.g., "N" or "Neutral") that indicates that each user classified into this group is a neutral user. Similarly, the conservative group may be associated with a label (e.g., "C" or "Conservative") that indicates that each user classified into this group is a conservative user.

The alignment checker 217 is a module that functions as a filter that filters out any news channels or TV programs associated with a tag contrary to the tag of the group that a user has been classified into. For example, a news item from a liberal news channel is considered contrary to a conservative user while the same news item from the liberal news channel is not considered contrary to a neutral user.

As an example, assume that users associated with the streaming devices 123-125 are classified respectively into a liberal group, a neutral group, and a conservative group. Further, assume that the collaborative filter 207 recommends multiple news items from one or more liberal news channels and one or more conservative news channels. The content aligner 209 can remove news items from the one or more conservative news channels and send the remaining news items to the streaming device 123 associated with a liberal user. Similarly, the content aligner 209 can remove news items from the one or more liberal news channels and send the remaining news items to the streaming device 125 associated with a conservative user. All news items recommended by the collaborative filter 207 can be sent to the streaming device 124 without undergoing any filtering because the user associated with the streaming device 124 is a neutral user in this example as mentioned above.

Figure 3:
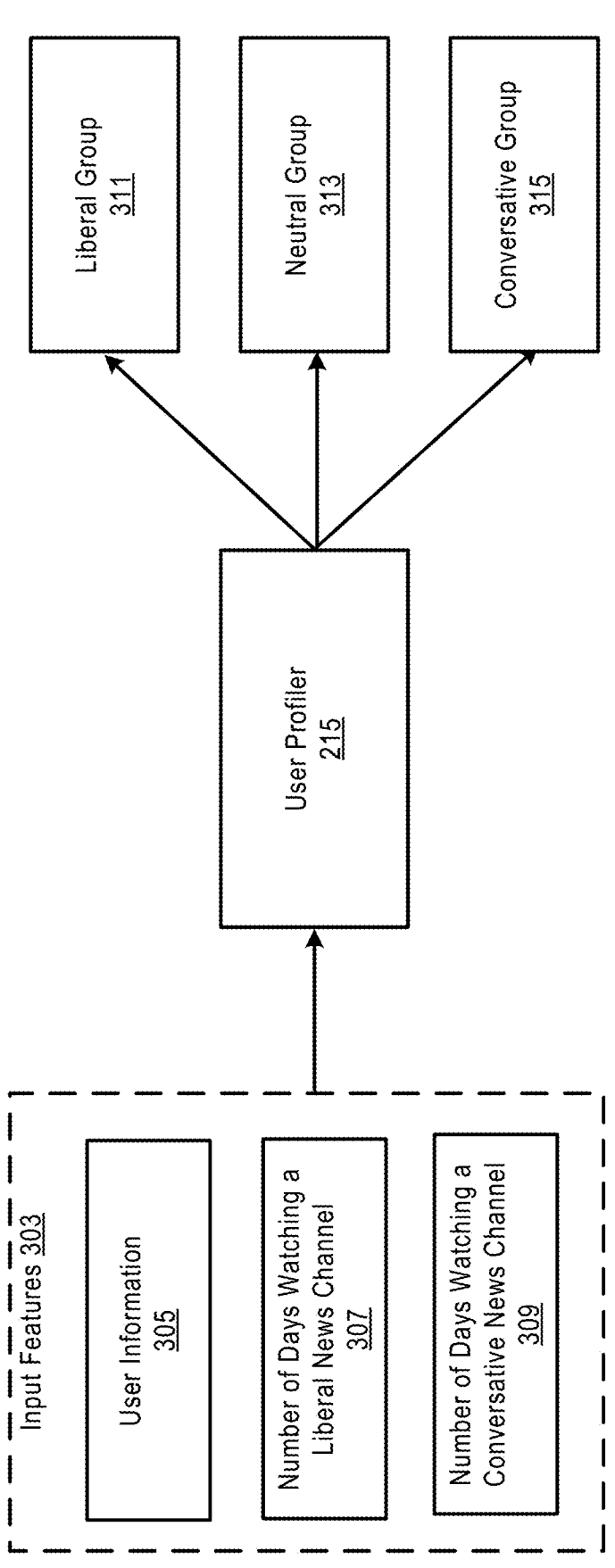
FIG. 3 is a block diagram further illustrating the user profiler according to an embodiment of the disclosure.

FIG. 3 is a block diagram further illustrating the user profiler 215 according to an embodiment of the disclosure. More specifically, FIG. 3 illustrates an embodiment where the user profiler 215 is implemented as a rule-based algorithm.

In an embodiment, when implemented as a rule-based algorithm, the user profiler 215 can take input features 303 of a plurality of users and classify the users into a liberal group 311, a neutral group 313, and a conservative group 315 in accordance with a set of rules. In an embodiment, the input features 303 can include information of the users 305, a number of days 307 that each user watches a liberal news channel in a past period of time, and a number of days 309 that each user watches a conservative news channel in the past period of time.

In an embodiment, the following table summarizes the rules encoded into the user profiler 215.

TABLE 1

| Number of Days Liberal News Channels Watched | Number of Days Conservative News Channels Watched | User Classifications |
|---|---|---|
| <30 Days | >30 Days | Conservative |
| >30 Days | <30 Days | Liberal |
| >30 Days | >30 Days | Neutral |
| <30 Days | <30 Days | Neutral |

As shown in Table 1 above, if a user watches a liberal news channel for no more than 30 days in the last 60 days and watches a conservative news channel for more than 30 days in the last 60 days, then the user can be classified as a conservative user. If a user watches a liberal news channel for more than 30 days in the last 60 days and a conservative news channel for no more than 30 days in the last 60 days, then the user can be classified as a liberal user. In other scenarios, i.e., when the users watched both types of news channels for more than 30 days or no more than 30 days in the last 60 days, the user is classified as a neutral user.

In the above example, the numbers of 30 days and 60 days are used for illustration, and it should be appreciated that other time periods can be used in actual implementations.

Figure 4:
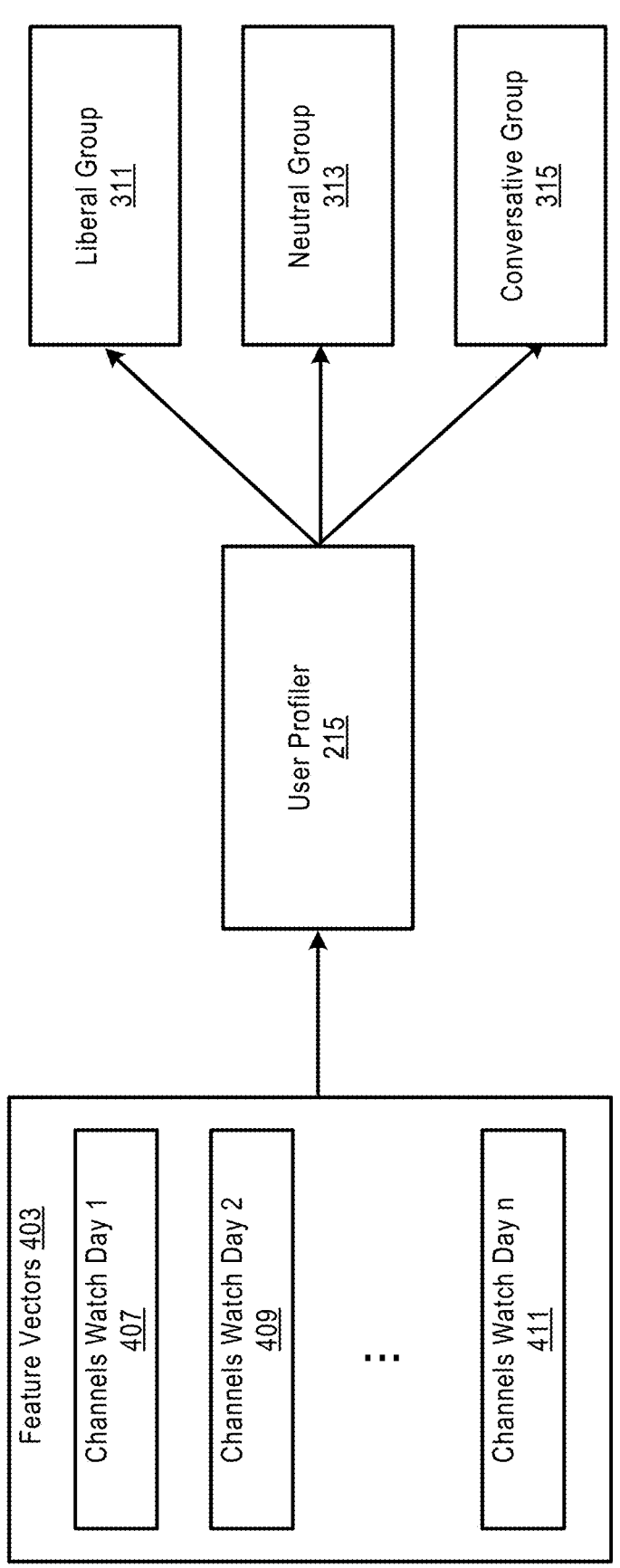
FIG. 4 is a block diagram illustrating another implementation of a user profiler according to an embodiment of the disclosure.

FIG. 4 is a block diagram illustrating another implementation of the user profiler 215 according to an embodiment of the disclosure. More specifically, FIG. 4 illustrates an embodiment where the user profiler 215 is implemented as a recurrent neural network (RNN) model.

In an embodiment, the RNN model can be trained on time-series historical data of a large number of users and the corresponding labels/tags, e.g., liberal, conservative, or neutral. Time-series historical data for each user can be represented as a sequence of vectors, where each vector represents the news channels that the user watched on a particular day in a past period of time (e.g., the past 60 days).

As shown, a sequence of feature vectors 403 can be provided as input to the user profiler 215 (i.e., a RNN model). The sequence of feature vectors 403 can include multiple vectors 407-411. The number of vectors in the sequence of feature vectors 403 is equivalent to the number of days in the past period of time. For example, the past period of time is 60 days, there would be 60 vectors in the sequence of feature vectors 403, with each vector provided for a day of the past period of time. Each vector can include news channels that a user watched on the corresponding day of the period of time.

In an embodiment, the RNN model can be further improved by using additional features, such as the number of days that the user watched each channel, the time of day that the user watched each channel, the geographic location of the user, and the user's social media activity.

Figure 5:
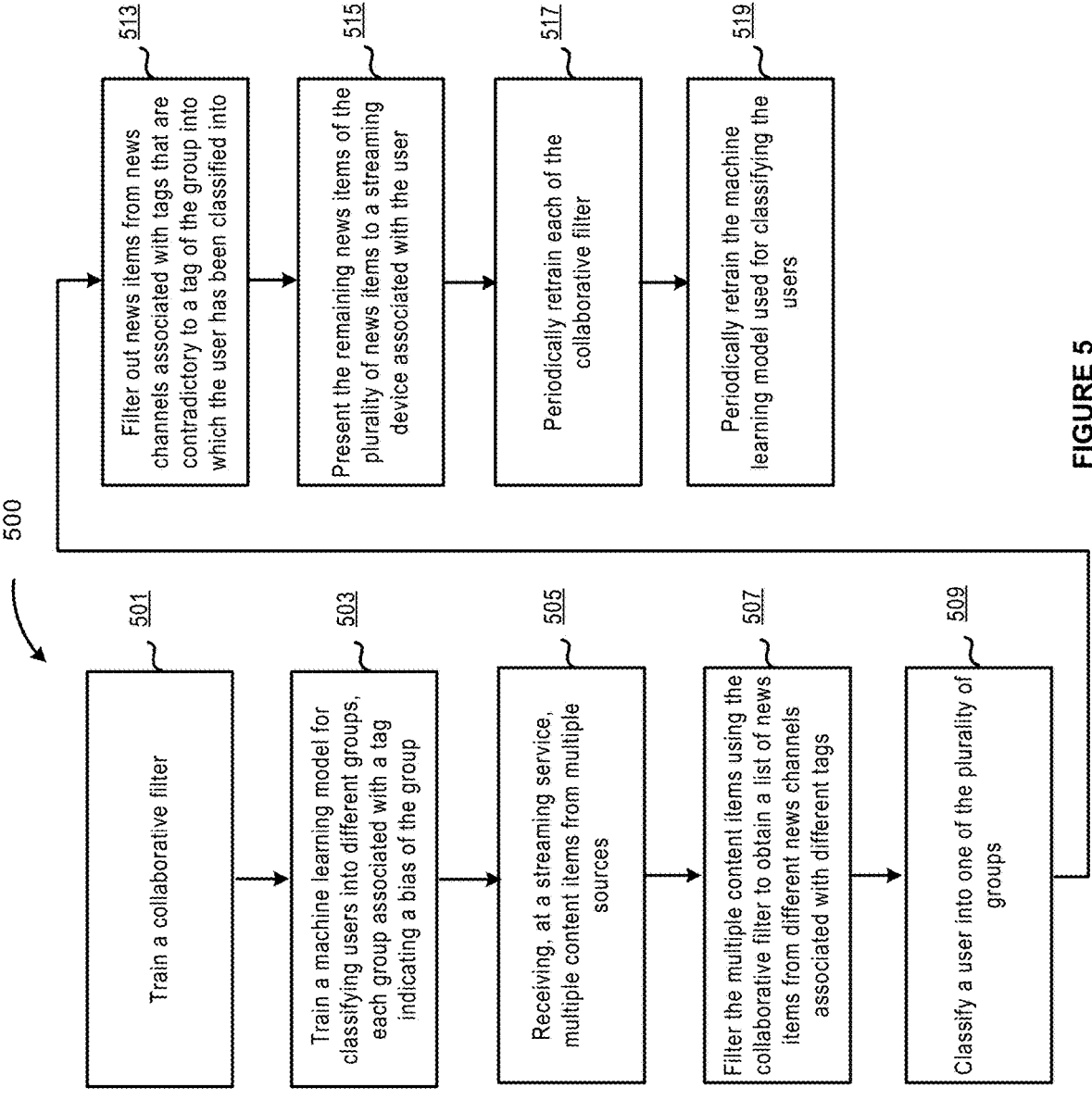
FIG. 5 is a block diagram illustrating a process of filtering news items in a streaming service according to an embodiment of the disclosure.

FIG. 5 is a block diagram illustrating a process 500 of filtering news items in a streaming service according to an embodiment of the disclosure. The process 500 can be performed by a processing logic, which may comprise software, hardware, and a combination thereof. For example, the process 500 can be performed by the content filtering system 107 as described in FIG. 1 and/or one or more other components that may or may not be described in this disclosure.

Referring to FIG. 5, at step 501, the processing logic trains a collaborative filter, which is a system or algorithm used for making recommendations to users of a TV/video streaming service. The collaborative filtering considers user preferences and/or behaviors to make suggestions. For instance, if users A, B, and C all like a particular news channel, and user A likes another news channel, the collaborative filter would recommend that news channel to B and C.

At step 503, the processing logic trains a machine learning model for classifying users into different groups, each group is associated with a tag that indicates a particular bias (e.g., liberal, conservative, neutral). The machine learning model can categorize users based on their content consumption patterns, preferences, or any other identifiable criteria that can be mapped to a specific bias or inclination.

At step 505, the processing logic receives multiple recommended channels. The recommended channels can include news channels, movie channels, games channels or other types of channels.

At step 507, the processing logic filters the multiple recommended channels using the trained collaborative filter to obtain a list of news channels with different tags. This may happen because the user's past watch patterns and/or other historical data indicate that the user is interested in watching news channels. The list of channel channels include one or more liberal news channels and one or more conservative news channels.

At step 509, the processing logic classifies the user into one of the plurality of groups based on the user's watch behavior in a past period of time (e.g., 60 days).

At step 513, the processing logic filters out news channels associated with tags that are contradictory to a tag of the group into which the user has been classified. This step filters out content deemed contradictory to the bias of the user's classified group. For example, if a user is categorized into a liberal group, any conservative channel may be filtered out for that user.

At step 515, the processing logic presents the remaining news channels to a streaming device associated with the user. In this step, content filtered to align with the user's classification is presented or streamed to the user's device. This ensures that the user receives content tailored to preferences or biases of the user.

At step 517, the processing logic periodically retrains each of the collaborative filter to ensure the collaborative filter remains up-to-date and effective. As user preferences evolve and new content emerges, the periodical retraining ensures that the filter continues to make accurate recommendations.

At step 519, the processing logic periodically retrains the machine learning model used for classifying the users. Similar to the collaborative filter, the machine learning model used for user classification is also periodically retrained. This ensures the model's classifications remain accurate as user behaviors and patterns change over time.

Thus, the process 500 can be used to deliver tailored news content to users based on their preferences and biases. By filtering out opposing or contradictory news content and periodically updating the system's models, the process 500 can consistently serve content that aligns with individual user biases.

FIG. 6 is a block diagram illustrating a process 600 of filtering news items in a streaming service according to an embodiment of the disclosure. The process 600 can be performed by a processing logic, which may comprise software, hardware, and a combination thereof. For example, the process 600 can be performed by the content filtering system 107 as described in FIG. 1 and/or one or more other components that may or may not be described in this disclosure.

At step 601, the processing logic classifies a user of a streaming service into one of a plurality of groups based on watch behavior of the user in a first past period, wherein each of the plurality of groups is associated with one of a plurality of tags.

At step 603, the processing logic recommends a plurality of channels to the user based on watch behavior of the user in a second past period, wherein each of the plurality of channels is associated with one of the plurality of tags.

At step 605, the processing logic removes one or more channels from the list of recommended channels based on the user's classification. Each of the removed channels is associated with a tag that is contrary to the user's group classification tag.

At step 607, the processing logic displays one or more content items from each of remaining channels of the plurality of recommended channels on a streaming device of the user.

Figure 7:
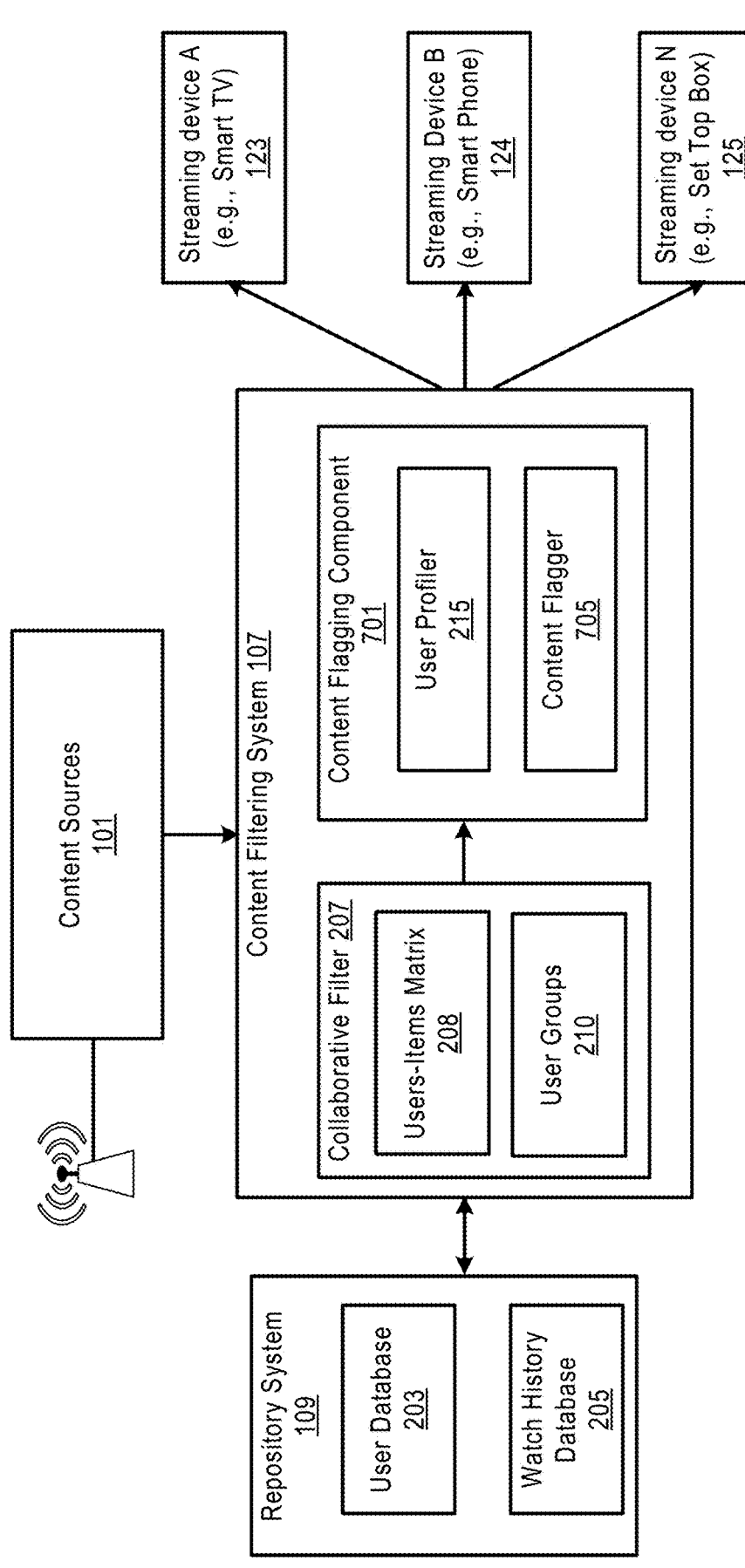
FIG. 7 is a block diagram illustrating a system for flagging one or more channels that conflicts with a user's classification according to one embodiment of the disclosure.

FIG. 7 is a block diagram illustrating a system for flagging content items that conflicts with a user's political bias according to an embodiment of the disclosure. More specifically, a content flagging component 701 can be used to flag conflicting channels using a content flagger 707.

In an embodiment, the content filtering system 107 can maintain tags for each channel. As used herein in this disclosure, a channel can refer to any of the following: (1) content curator or brand; (2) live streaming feeds; (3) on-demand libraries; (4) user-created channels; and (5) subscription packages. Each channel of a streaming service is pre-tagged as liberal, conservative, or neutral according to one implementation.

Upon receiving recommended news channels for a user from the collaborative filter 207, the content flagging component 701 can invoke the user profiler 215 to classify the user into one of the liberal group, the conservative group, or the neutral group. The content flagger 705 can flag channels that have contrary classifications to the user. In an embodiment, the content flagger 705 can flag a channel by promoting the channel on a user's homepage or landing screen. For example, the content flagger 705 can invoke one or more functions to highlight the channel for the user as soon as the user logs in or access the streaming service platform. As another example, the content flagger 705 can involve one or more functions to display in-app messages or banners about the channel to be flagged while the user is streaming. As another example, the flagging may include recommending the channel to the user and/or providing the channel as part of a group of other channels recommended to the user or otherwise promoting the channel without specifically indicating the channel has a contrary classifications to the user.

In another implementation, channel and user classifications may be distributed along a bias spectrum instead of being assigned categorical values. For example, in a bias spectrum from 10 to −10, with 10 being extremely liberal, −10 being extremely conservative, and 0 being neutral, a user or a channel may be placed on the bias spectrum between 10 and 0 or between 0 and −10. In this embodiment, whether the content flagger 705 flags a channel for a particular user is based on the distance between a user and a channel on the bias spectrum exceeding a threshold distance.

For example, given a threshold distance of 5, a channel at the position of 3 on the bias spectrum would be flagged for a user at the position of –3 because the distance between the user and the channel is 6, which exceeds the threshold.

In another implementation, the content filtering system 107 can store user classification information into the user database 203 for use by other components, such as the content alignment checker 217 in FIG. 2.

In an example embodiment, the user may provide and the system may receive input indicating a selection to opt in to the feature that flags for the user channels that have has a contrary classifications to the user or otherwise that conflicts with a classification of the user. In response, the system may start to provide the optional feature that flags for the user channels that have has a contrary classifications to the user or otherwise that conflicts with a classification of the user.

FIG. 8 is flow chart illustrating a process 800 of flagging one or more channels that conflicts with a user's classification according to one embodiment of the disclosure. The process 800 can be performed by a processing logic that may comprise software, hardware, or a combination thereof. For example, the process 800 may be performed by the content flagging component 701 described in FIG. 7.

Referring to FIG. 8, at step 801, the processing logic classifies a user of a streaming service into one of a plurality of groups based on watch behavior of the user in a first past period, wherein each of the plurality of groups is associated with one of a plurality of tags. The user can be classified into a finite number of categories or placed on a bias spectrum.

At step 803, the processing logic recommends a plurality of channels to the user based on watch behavior of the user in a second past period, wherein each of the plurality of channels is associated with one of the plurality of tags. Each recommended channel can either be labeled with a tag indicating the political bias of the channel or place on the bias spectrum.

At step 805, the processing logic displays the plurality of recommended channels on a streaming device of the user, and flags one or more channels from the plurality of recommended channels to the user that conflicts with a classification of the user. A conflicting channel may have a contrary tag that conflicts with a classification of the user or has a distance exceeding a given threshold on the bias spectrum.

Figure 9:
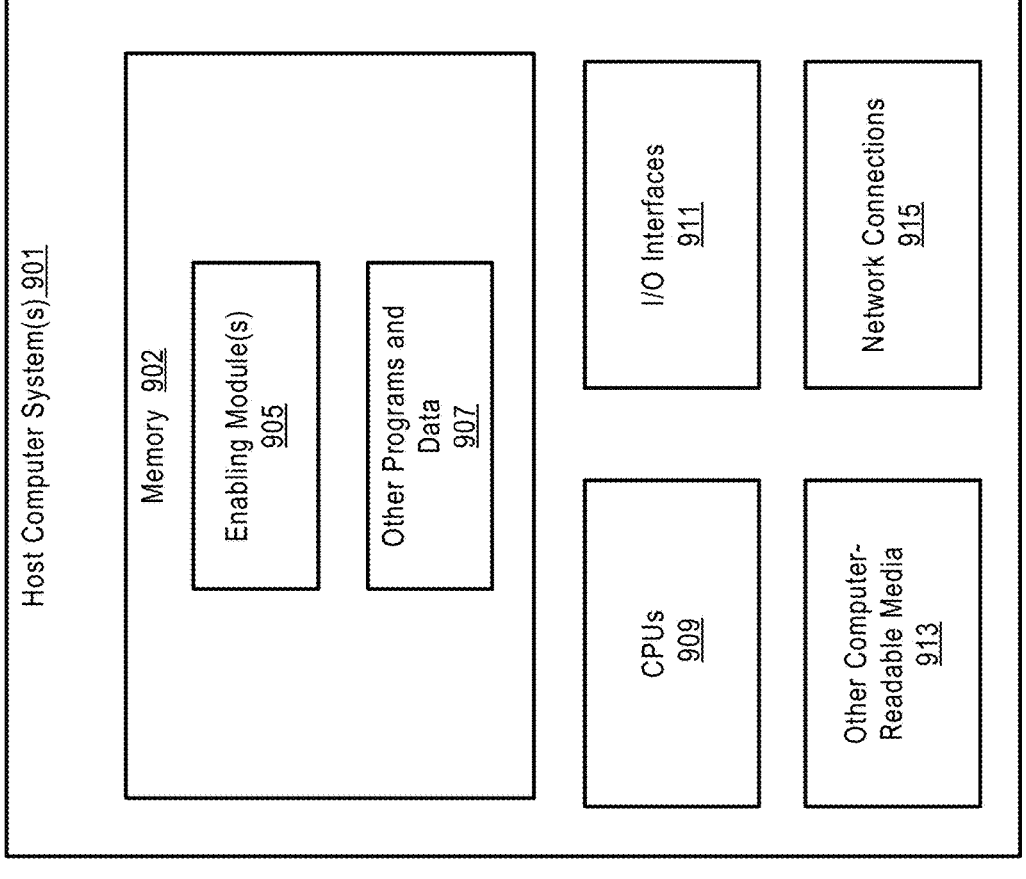
FIG. 9 shows a system diagram that describes an example implementation of a computing system(s) for implementing embodiments described herein.

FIG. 9 shows a system diagram that describes an example implementation of a computing system(s) for implementing embodiments described herein.

The functionality described herein can be implemented either on dedicated hardware, as a software instance running on dedicated hardware, or as a virtualized function instantiated on an appropriate platform, e.g., a cloud infrastructure. In some embodiments, such functionality can be completely software-based and is designed as cloud-native, meaning that they are agnostic to the underlying cloud infrastructure, allowing higher deployment agility and flexibility. However, FIG. 9 illustrates an example of underlying hardware on which such software and functionality can be hosted and/or implemented.

In this embodiment, an example host computer system(s) 901 is used to represent one or more of those in various components shown and/or described herein that are, or that host or implement the functions of: streaming devices, components, microservices, machine learning models, and/or other aspects described herein, as applicable, for filtering content items in a streaming service. In some embodiments, one or more special-purpose computing systems can be used to implement the functionality described herein. Accordingly, various embodiments described herein can be implemented in software, hardware, firmware, or in some combination thereof. Host computer system(s) 901 can include memory 902, one or more central processing units (CPUs) 909, I/O interfaces 911, other computer-readable media 913, and network connections 915.

Memory 902 can include one or more various types of non-volatile (non-transitory) and/or volatile (transitory) storage technologies. Examples of memory 902 can include, but are not limited to, flash memory, hard disk drives, optical drives, solid-state drives, various types of random-access memory (RAM), various types of read-only memory (ROM), neural networks, other computer-readable storage media (also referred to as processor-readable storage media), or the like, or any combination thereof. Memory 902 can be utilized to store information, including computer-readable instructions that are utilized by CPU 909 to perform actions, including those of embodiments described herein.

Memory 902 can have stored thereon enabling module(s) 905 that can be configured to implement and/or perform some or all of the functions of the systems, components and modules described herein. Memory 902 can also store other programs and data 907, which can include rules, databases, application programming interfaces (APIs), software containers, nodes, pods, clusters, node groups, control planes, software defined data centers (SDDCs), microservices, virtualized environments, software platforms, cloud computing service software, network management software), artificial intelligence (AI) or machine learning (ML) programs or models to perform the functionality described herein, user interfaces, operating systems, etc.

Network connections 915 are configured to communicate with other computing devices to facilitate the functionality described herein. In various embodiments, the network connections 915 include transmitters and receivers (not illustrated), cellular telecommunication network equipment and interfaces, and/or other computer network equipment and interfaces to send and receive data as described herein, such as to send and receive instructions, commands and data to implement the processes described herein. I/O interfaces 911 can include video interfaces, other data input or output interfaces, or the like. Other computer-readable media 913 can include other types of stationary or removable computer-readable media, such as removable flash drives, external hard drives, or the like.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims but should be construed to include all possible embodiments along with the full scope of equivalents to which such claims are entitled. Accordingly, the claims are not limited by the disclosure.

The invention claimed is:

1. A method of filtering content items in a streaming service, comprising:

classifying a user of a streaming service into one of a plurality of groups based on watch behavior of the user in a first past period, wherein each of the plurality of groups is associated with one of a plurality of tags;

recommending a plurality of channels to the user based on watch behavior of the user in a second past period, wherein each of the plurality of channels is associated with one of the plurality of tags;

removing one or more channels from the plurality of recommended channels to the user, wherein each of the one or more removed channels is associated with a tag contrary to the tag associated with the group that the user has been classified into; and displaying one or more content items from each of remaining channels of the plurality of recommended channels on a streaming device of the user.

2. The method of claim 1, wherein each of the plurality of channels recommended to the user is a news channel.

3. The method of claim 2, wherein the plurality of tags indicate that the plurality of recommended channels include one or more liberal channels and one or more conservative channels.

4. The method of claim 3, wherein each of the plurality of groups includes a conservative group, a neutral group, and a liberal group.

5. The method of claim 4, wherein the classifying of the user into one of the plurality of groups further includes:

determining a number of days that the user has watched each of the plurality of recommended channels within the first past period;

if the user has watched a liberal channel for a number of days no more than a threshold and has watched a conservative channel for a number of days exceeding the threshold, classifying the user into the conservative group;

if the user has watched a conservative channel for a number of days no more than a threshold and has watched a liberal channel for a number of days exceeding the threshold, classifying the user into the liberal group; and if the user has watched each of a conservative channel and a liberal channel for a number of days no more than the threshold or has watched each of a conservative channel and a liberal channel for a number of days exceeding the threshold, classifying the user into the neutral group.

6. The method of claim 5, wherein the threshold is one of a 30-day period, a 60-day period, or a 90-day period.

7. The method of claim 6, wherein each of the first past period and the second past period is a multiple of the threshold.

8. The method of claim 1, wherein the tag associated with each of the plurality of channels is predetermined by the streaming service.

9. The method of claim 1, wherein the streaming service is an application-based television service that streams live television and on-demand content over the internet.

10. A system for filtering content items in a streaming service, comprising:

one or more processors; and one or more memories that are coupled to the one or more processors and storing program instructions, which, when executed by the one or more processors, cause the system to perform operations comprising:

classifying a user of a streaming service into one of a plurality of groups based on watch behavior of the user in a first past period, wherein each of the plurality of groups is associated with one of a plurality of tags;

recommending a plurality of channels to the user based on watch behavior of the user in a second past period, wherein each of the plurality of channels is associated with one of the plurality of tags;

removing one or more channels from the plurality of recommended channels to the user, wherein each of the one or more removed channels is associated with a tag contrary to the tag associated with the group that the user has been classified into; and displaying one or more content items from each of remaining channels of the plurality of recommended channels on a streaming device of the user.

11. The system of claim 10, wherein each of the plurality of channels recommended to the user is a news channel.

12. The system of claim 11, wherein the plurality of tags indicate that the plurality of recommended channels include one or more liberal channels and one or more conservative channels.

13. The system of claim 12, wherein each of the plurality of groups includes a conservative group, a neutral group, and a liberal group.

14. The system of claim 13, wherein the classifying of the user into one of the plurality of groups further includes:

determining a number of days that the user has watched each of the plurality of recommended channels within the first past period;

if the user has watched a liberal channel for a number of days no more than a threshold and has watched a conservative channel for a number of days exceeding the threshold, classifying the user into the conservative group;

if the user has watched a conservative channel for a number of days no more than a threshold and has watched a liberal channel for a number of days exceeding the threshold, classifying the user into the liberal group; and if the user has watched each of a conservative channel and a liberal channel for a number of days no more than the threshold or has watched each of a conservative channel and a liberal channel for a number of days exceeding the threshold, classifying the user into the neutral group.

15. The system of claim 14, wherein the threshold is one of a 30-day period, a 60-day period, or a 90-day period.

16. The system of claim 15, wherein each of the first past period and the second past period is a multiple of the threshold.

17. The system of claim 10, wherein the tag associated with each of the plurality of channels is predetermined by the streaming service.

18. The system of claim 10, wherein the streaming service is an application-based television service that streams live television and on-demand content over the internet.

19. A method of filtering content items in a streaming service, comprising:

classifying a user of a streaming service into one of a plurality of groups based on watch behavior of the user in a first past period, wherein each of the plurality of groups is associated with one of a plurality of tags;

recommending a plurality of channels to the user based on watch behavior of the user in a second past period, wherein each of the plurality of channels is associated with one of the plurality of tags; and displaying the plurality of recommended channels on a streaming device of the user, wherein the displaying of the plurality of recommended channels includes flagging one or more channels from the plurality of recommended channels to the user that conflicts with a classification of the user.

20. The method of claim 19, wherein the flagging of the one or more channels comprises one or more of the following:

highlighting each of the one or more channels on the user's home page or landing screen; or displaying in-app messages or banners about the each of the one or more channels while the user is streaming.

* * * * *